CODE MODULES

Filed May 27, 1966 4 Sheets-Sheet 1

INVENTORS.
ALEX WADOLNY
ROBERT BRATEK
BY
Morris Michael Marks
ATTORNEY.

INVENTORS.
ALEX WADOLNY
ROBERT BRATEK
BY
Morris Michael Marks
ATTORNEY.

CODE MODULES

Filed May 27, 1966 4 Sheets-Sheet 3

INVENTORS.
ALEX WADOLNY
ROBERT BRATEK
BY
ATTORNEY.

Nov. 7, 1967 A. WADOLNY ETAL 3,351,817

CODE MODULES

Filed May 27, 1966 4 Sheets-Sheet 4

INVENTORS.
ALEX WADOLNY
ROBERT BRATEK

BY Morris Michael Marks

ATTORNEY.

3,351,817

CODE MODULES

Alex Wadolny, 2778 Lantern Lane, Audubon, Pa. 19407, and Robert Bratek, 7648 Brockton Road, Philadelphia, Pa. 19151

Filed May 27, 1966, Ser. No. 553,435
6 Claims. (Cl. 317—112)

ABSTRACT OF THE DISCLOSURE

Layered encoding modules suitable for use in a keyboard including, a pair of contiguous encapsulating matrix members holding therebetween electric circuit elements such as diodes and resistors and the like in a circuit arrangement by utilizing quickly detachable solderless connections, an external circuit connector connected to one of the matrix members and the circuit elements for plug-in operation of the entire module, a hollow casing with a switch inside connected to the other matrix member and the circuit elements, and a key outside of the casing carried by a plunger extending into the casing to actuate the switch therein and produce an encoded signal output at the external connector. The entire assembly is secured together by one or more screws extending through the module layers which when loosened permit the matrix member connected to the external circuit connector to be detached so that any of the encapsulated circuit elements can be quickly replaced to change the encoding, and the module may be quickly resecured and replaced in its circuit.

Our invention relates to code modules, and it relates more particularly to component-containing modules which may be used in electronic computer systems or the like.

In many computer systems, programs are varied by means of variations in the assemblage of components such as diodes. A switch or switches may be associated with these components, and intricate hardwiring frequently results. Shorting, inadvertent separation of connections, and human error in the process may result in serious breakdown as well as in loss of time required for correcting the difficulty. Moreover, numerous wires are frequently required between the switching apparatus and the components, making the change of programming more involved and time-consuming, and necessitating the services of a programming expert. Not only so, but the intricate hardwiring is generally not of such a nature as to be shockproof or vibration-proof.

One object of our invention therefore is to provide means for changing the program without necessitating hardwiring.

Another object of our invention is to provide means whereby the keyboard operator can, by the use of simple instructions, change the programming without resorting to a programming expert.

A further object of our invention is to provide means for achieving desired changes of program in a minimum of time, without the use of tools, and with full assurance of accuracy.

Another object of our invention is to provide means whereby components can be quickly and easily removed or replaced in a module without the use of heat, and without damage to the wiring or the module housing.

A further object of our invention is to provide a code assembly which is shockproof, vibration-proof, and yet readily capable of access to the interior thereof for revision of coded arrangement therein.

Another object of our invention is to provide a code module that may include a large number of components and yet be of small dimension.

A further object of our invention is to provide a module which, while containing a large number of components, is so constructed as to render each component easy to grasp and to control in the insertion and removal from the module.

Another object of our invention is to provide a module that is so constructed that it encapsulates the components contained therein while being capable of being opened in a manner to expose the components for rearranging without disturbing the electrical connections to the encapsulant.

A further object of our invention is to provide a module adapted to encapsulate components when the module is closed, the encapsulating operation being such as to force the component leads into electrical contact with the exterior conductor pins mounted on the module.

Another object of our invention is to provide a switch such for instance as a keyboard key, that is combined with a module containing components in such a manner that their relation to the circuitry can be selectively varied operably to vary the programming.

A further object of our invention is to provide a code module that is readily interchangeable with other code modules in a switch-module combination.

Another object of our invention is to provide means whereby delicate switch mechanism may be utilized in a keyboard in such a manner as to reduce to a minimum the shock or vibration to which such mechanism is subjected by the operation of the key with which it is associated.

A further object of our invention is to provide a package of key-switch-code module combinations which may be used per se or in combination with other similar packages in a multi-layer keyboard, and which is adaptable for easy access to the interior thereof for purposes of replacement of components or variation of programming, and with a minimum of hardwiring.

Another object of our invention is to provide a module and a package associated therewith, which is simple, easy and inexpensive to manufacture and to assemble.

For the purpose of illustrating our invention, we have shown in the accompanying drawings forms thereof which are at present preferred by us, since the same have been found to give satisfactory and reliable results, although it is to be understood that the various instrumentalities of which our invention consists can be variously arranged and organized, and that our invention is not limited to the precise arrangements and organizations of the instrumentalities as herein shown and described.

Referring now to the drawings in which like reference characters indicate like parts:

Figure 1:
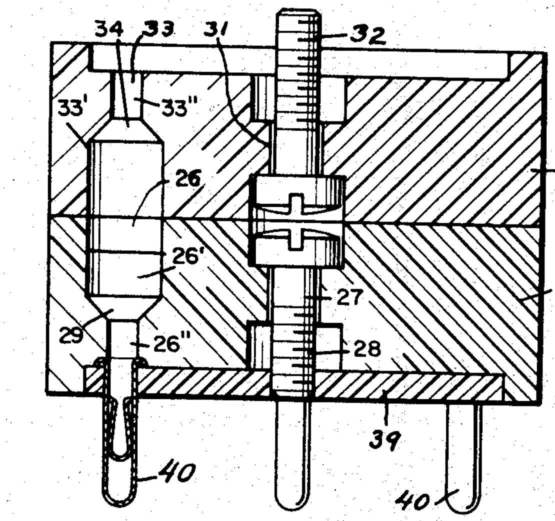
FIGURE 1 represents a vertical sectional view illustrating a module embodying our invention.
Figure 2:
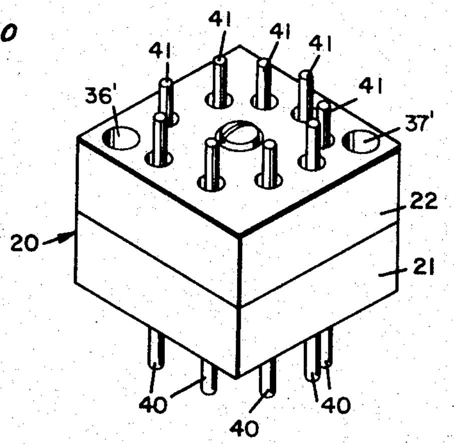
FIGURE 2 represents a perspective view illustrating a module embodying our invention.
Figure 10:
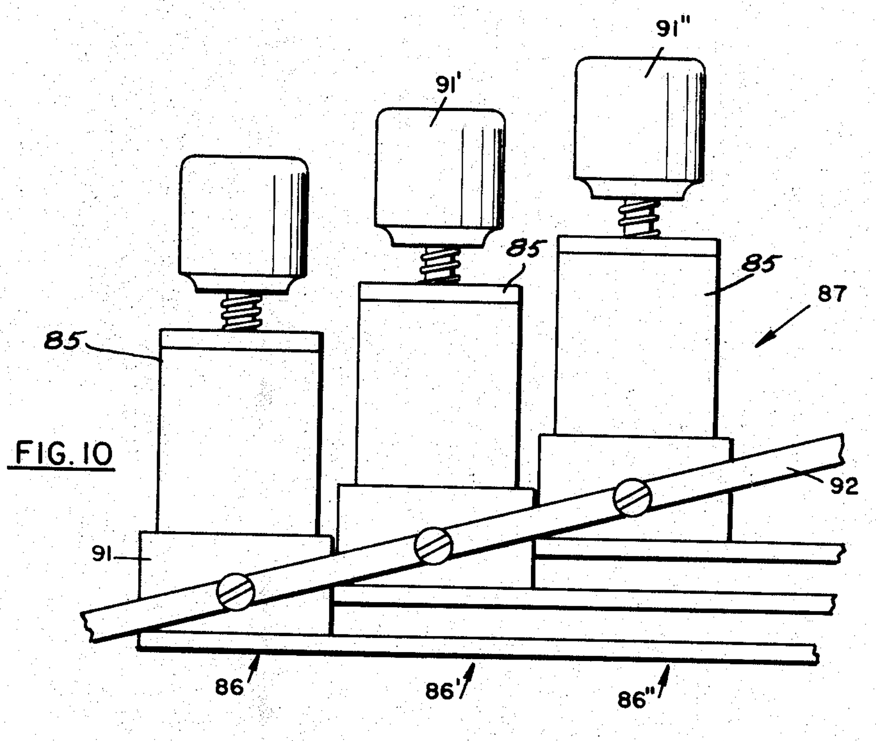
FIGURE 10 represents an end elevational view illustrating a keyboard having a series of banks of packages comprising modules, and embodying our invention.
Figure 3:
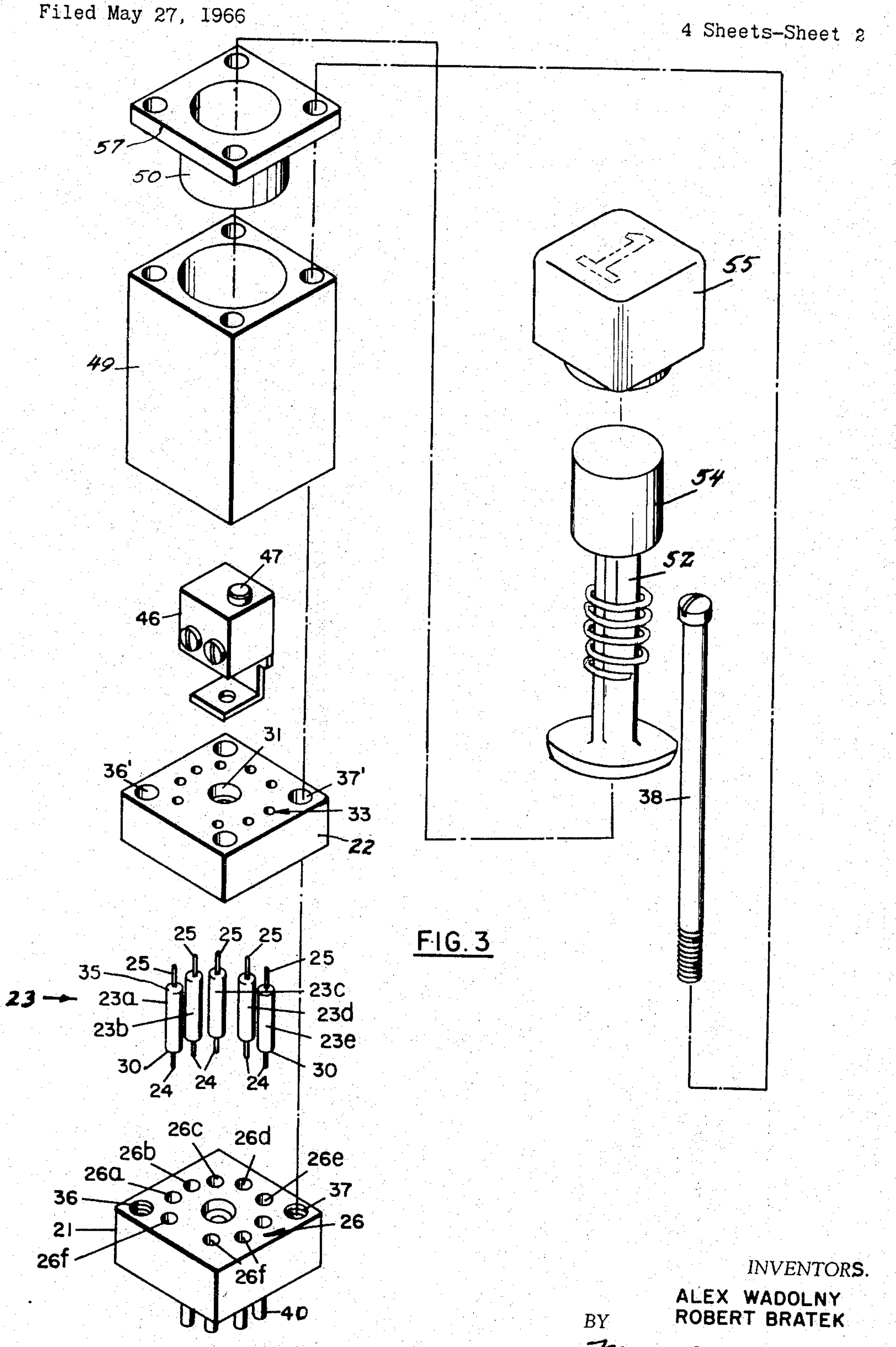
FIGURE 3 represents an exploded view illustrating a key, plunger, switch and module, and embodying our invention.
Figure 4:
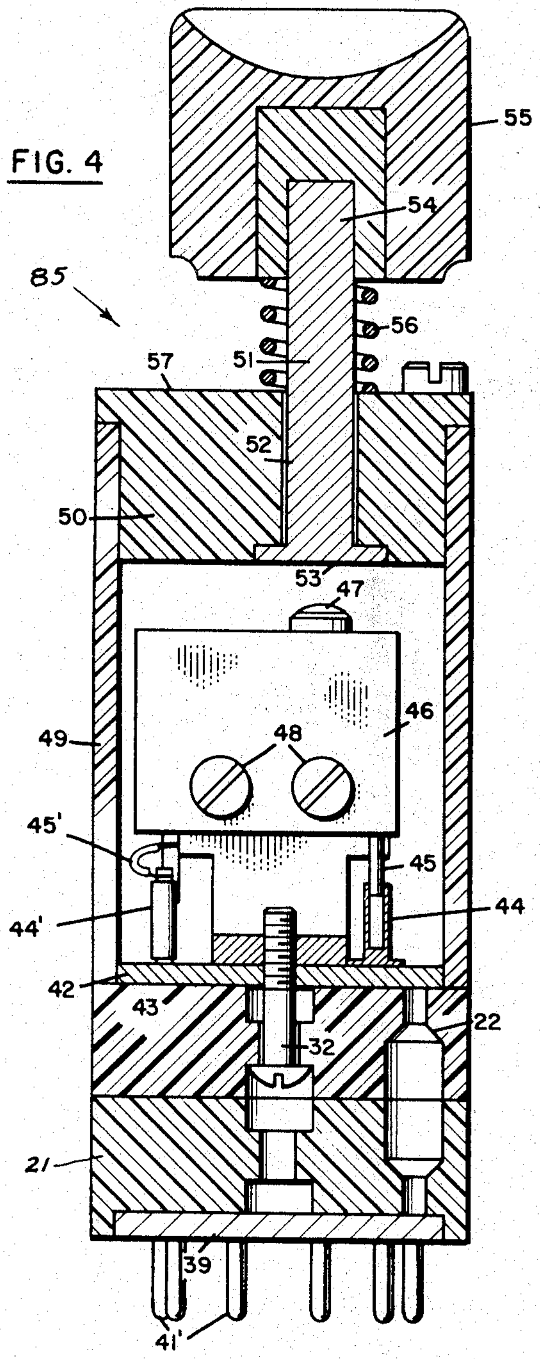
FIGURE 4 represents a vertical sectional view illustrating a package comprising a key-operated switch and module, and embodying our invention.

While our invention may be made in any desired size, for purpose of clarity it has been illustrated in various of these figures in larger size than that which would customarily be used.

According to our invention we provide a module 20 comprising sectional encapsulants 21 and 22 adapted releasably to hold components 23 such as the dodes 23*a*, 23*b*, 23*c*, 23*d*, 23*e* each having a lower lead 24 and an upper lead 25. Suitable recesses 26 are provided in the lower section 21 to receive the lower portions of the components 23. Thus, the recess 26*a* is adapted to receive the portion of the component 23*a* with its lower lead 24, the recess 26*b* is adapted to receive the power portion of the component 23*b* and its lower lead 24, the recess 26*c* is adapted to receive the lower portion of the component 23*c* with its lower lead 24, the recess 26*d* is adapted to receive the lower portion of the component 23*d* and its lower lead 24, and the recess 26*e* is adapted to receive the lower portion of the compartment 23*e* and its lower lead 24. Other recesses 26*f* may be provided to receive additional components should they be required.

In a preferred form, the lower section 21 may be formed of square or other desired cross section and preferably comprises a central countersunk orifice 27 adapted to receive a downwardly extending cap screw 28 Also in a preferred form, the recesses 26 are concentrically disposed about said orifice 27 and extend longitudinally through the lower section 21. Each recess 26 comprises an upper portion 26′ having a diameter equal to or slightly greater than that of the component 23 which it is adapted to hold, and lower portion 26″ having a diameter slightly larger than that of the lower lead 24. A suitable shoulder 29 extends between the upper portion 26′ and lower portion 26″ and is adapted to bear against and to retain the lower edge 30 of the component 23.

In a similar manner the upper section 22 comprises a central countersunk orifice 31 adapted to retain an upwardly extending cap screw 32; and longitudinal recesses 33 extend concentrically about the orifice 31 in registry with the recesses 26. Each upper recess 33 has a lower portion 33′ adapted to embrace and to hold the upper portion of the compartment 23 whose lower portion is disposed in the recess 26 with which the upper recess 33 is in registry. The lower portion 33′ of each recess 33 is conected by a shoulder 34 with an upper portion 33″ adapted to receive the upper lead 25 of said component, and the shoulder 34 is adapted to bear against and to retain the upper edge 35 of said component.

Suitable orifices 36 and 37 may be disposed in corner portions of the lower section 21, and corresponding orifices 36′ and 37′ may be disposed in similar portions of the upper section 22 and respectively in registry with the orifices 36 and 37, and adapted to receive retaining bolts 38 to be described hereinafter.

A matrix module header plate 39, made of suitable insulation, may be mounted substantially along the bottom face of the lower section 21, and spring-pin or other suitable receptacles 40 may project downwardly through the header plate 39 and in registry with the recesses 26, operably to receive and to be electrically connected with the lower leads 34 of each of the components 23. The matrix module header plate 39 may be secured to the lower section 21 by means of the cap screw 28.

Similar spring-pin or other suitable receptacles 41 may be mounted on the upper section 22 in a manner to project upwardly therefrom, and each respectively in registry with one of the recesses 33, operably to receive and to be electrically connected with the upper lead 25 of the component 23 disposed in said recess. The pins 41 may be connected in any suitable manner to the circuitry.

In operation, when the components 23 are being assembled with the sectional encapsulants 21 and 22, they are vertically inserted in the desired recesses 26 of the lower sectional encapsulant 21, with their lower leads 24 projecting into the reduced diameter portions 26″. The upper sectional encapsulant 22 is then positioned over the upwardly projecting portions of the components 23 with the recesses 33 in registry with the corresponding recesses 26. The upper sectional encapsulant 22 is then lowered until it abuts the lower sectional encapsulant 21. In this process, the shoulder 34 of the upper recess 33 bears against the upper edge 35 of the component and urges it downwradly until the lower edge 30 of the component bears against the shoulder 29 of the recess 26. In so doing however, the upper lead 25 is forced into the pin 41 and in electrical communication therewith.

When it is desired to rearrange the components, it is merely necessary to pull the upper sectional encapsulant 22 from the lower sectional encapsulant 21 and thereby expose the components extending from the recesses 26 and 33. In this process, either the leads 24 or 25 are withdrawn from their respective receptacles 40 or 41. The exposed components can now be readily grasped for removal from the recesses. Thus they may be withdrawn, replaced or rearranged as desired.

In one form of our invention, in place of the upwardly projecting pins 41, a common or base plate 42 may be disposed on the upper face portion 43 of the upper section 22 and in electrical contact with a desired number of the upper leads 25. The base plate 42 may be secured to the upper section 22 by any suitable means such as the cap screw 32. Suitable connecting means such as the spring-pin 44 may be mounted on the upper portion of the base plate 42 in a manner to receive and to retain in electrical contact a lead 45 projecting downwardly from a suitable microswitch 46 having a button 47. Another lead 45′ may extend from the microswitch 46 and be connected to a pin 44′ extending through, and insulated from the base plate 42, and sections 21 and 22, and in electrical contact with the downwardly projecting pin 41′.

The microswitch 46 may be secured as by bolts 48 to the interior of a housing 49 which may be of the same peripheral size and shape as those of the upper section 22. A bushing 50 may be disposed in the upper end of the housing 49 and adapted slideably to retain a plunger 51 having a shaft portion 52, and an interior bearing portion 53 adapted to bear against the button 47 in a manner to depress it when the plunger is advanced inwardly into the interior of the housing 49. In a preferred form, the bearing portion 53 extends laterally beyond the shaft portion 52 in a manner to prevent withdrawal of the plunger 51 through the bushing 50. The shaft portion 52 extends upwardly from the bushing 50 to an anchor portion 54 adapted to be disposed in a suitable key 55. A compression spring 56 may be disposed between the key 55 and the upper face 57 of the bushing 50. The bushing 50, housing 49, upper section 22 and lower section 21 may be secured in place and held in one unitary package 85 including the key 55 and plunger 51 upwardly projecting from the bushing 50, by means of the retaining bolts 38.

There is thus provided a unitary package 85 comprising a key operated switch connected to a plurality of components without the required use of hardwiring. Not only so, but the circuitry or programming can be readily changed by the simple expedient of releasing the retaining bolts 38, separating the lower section 21 from the upper section 22 and rearranging or replacing the components 23 in the recesses 26 and 33 according to the requirements of the newly desired circuitry or programming. The lower section 21 is then again brought into juxtaposition to the upper section 22 and the retaining bolts 38 are again tightened. The newly programmed switch is now ready to be reinserted into the circuit. It is to be understood that the downwardly projecting pins 40 are adapted to be received by any suitable circuit receptacle (not shown) and in electrical contact therewith.

Figure 5:
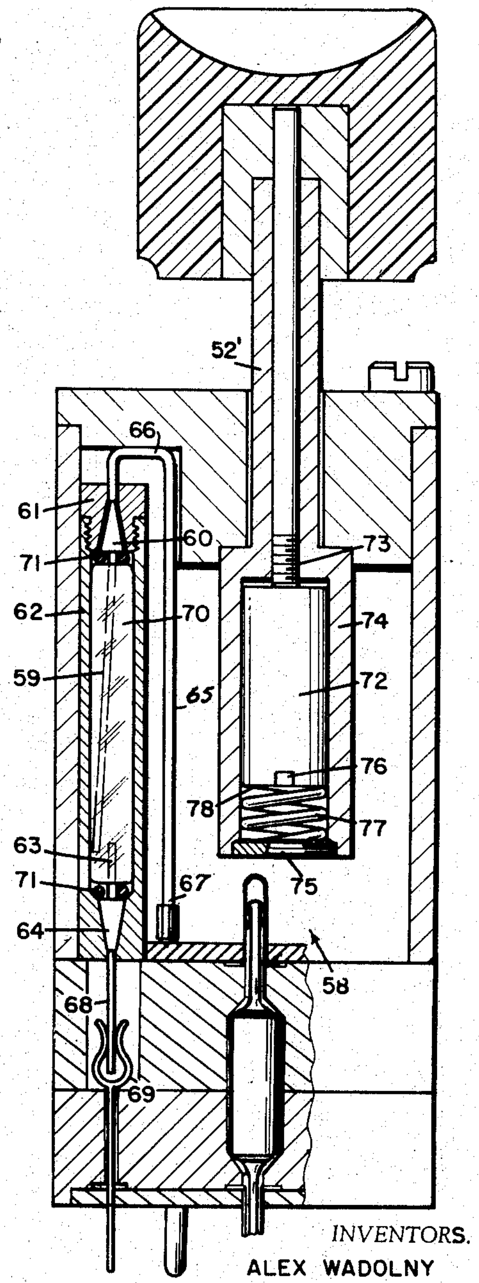
FIGURE 5 represents a vertical sectional view illustrating a package of modified construction comprising a key-operated reed switch and module, and embodying our invention.

In FIGURE 5 is illustrated a modified construction embodying our invention, wherein a reed switch 58 is utilized in place of the microswitch 46. The reed switch 58 preferably comprises a magnetic reed 59 carried by a split tapered conical contact member 60 mounted in a threaded cap 61 disposed in one end of a preferably plastic tubular housing 62. An electrical contact member 63 projects into the interior of the opposed end of the housing 62, and is mounted on a substantially similar split tapered conical member 64. In one desired form, a square post 65 is connected to the contact member 60 and is reversely bent as at 66 to project downwardly to a contact portion 67 received by, and in electrical communication with, the spring-pin 44. A suitable lead 68 extends from the contact member 64 and is adapted to be connected to a desired portion 69 of the circuitry. In a preferred form, the reed 59 and the contact member 63 are disposed in a glass encapsulant 70, and resilient grommets 71 are disposed between the glass encapsulant 70 and the portions of the interior of the housing 62.

The switch operating magnet 72 may be threadedly engaged as at 73 with the plunger shaft 52'. In one form of our invention, a chamber 74 may project interiorly from the plunger shaft 52' in a manner to house the magnet 72, and a removable cover plate 75 may be threadedly secured to the interior of the chamber 72. The interior end of the magnet may be slotted as at 76 to receive a screw driver, and suitable retaining means such as a compression spring 77 may be disposed between the cover plate 75 and the interior face 78 of the magnet 72 thereby to inhibit undesired rotation of the magnet 72.

In operation, the timing of the operation of the reed switch 58 may be controlled by adjusting the longitudinal location of the magnet 72, and this control is integrated with the programming of the components 23 which can be replaced or rearranged as hereinabove described.

When it is desired to replace encapsulated portion of the reed switch 58, it is merely necessary to unscrew the threaded cap 61 and to withdraw the encapsulant 70. A replacement encapsulant may then be inserted in its place, with its lead 63 in contact with the conical member 64. Replacing the threaded cap 61 draws the upper lead of replacement encapsulant 70 into contact with the contact member 60, and the replacement has been completed. It will be noted that the package containing the reed switch 58 is so arranged as to avoid the usual deficiencies of reed switches of the prior art, particularly those resulting from jarring, vibration or the like.

Figure 6:
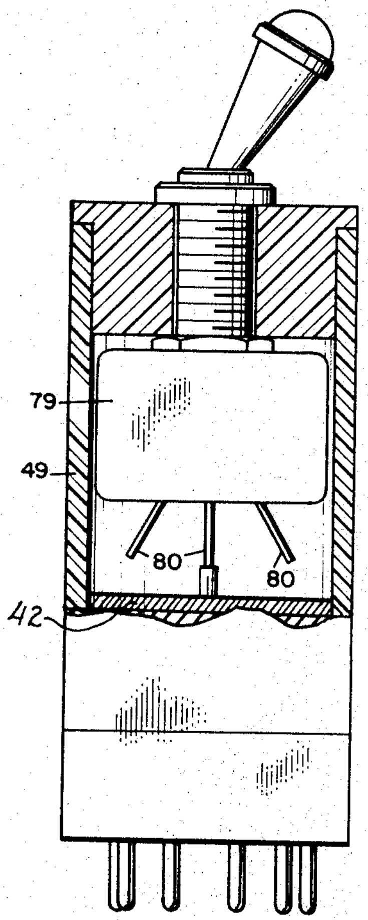
FIGURE 6 represents an elevational view, partly in secton, illustrating a package of another modified construction, comprising a switch and module, and embodying our invention.
Figure 8:
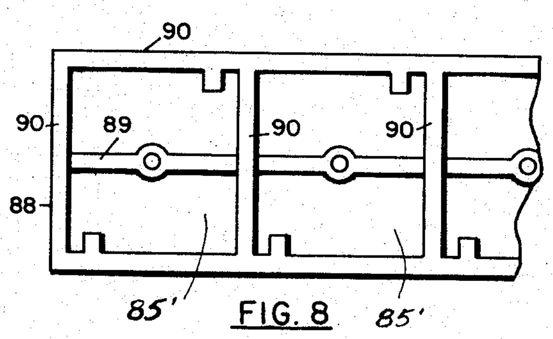
FIGURE 8 represents a plan view illustrating the receptacle portion of a bank of packages comprising a module, and embodying our invention.

In FIGURE 6 is illustrated another modified construction embodying our invention. In this construction, the housing 49 contains a toggle switch 79 having leads 80, one of which is secured to, and in electrical communication with, the base plate 42.

Figure 7:
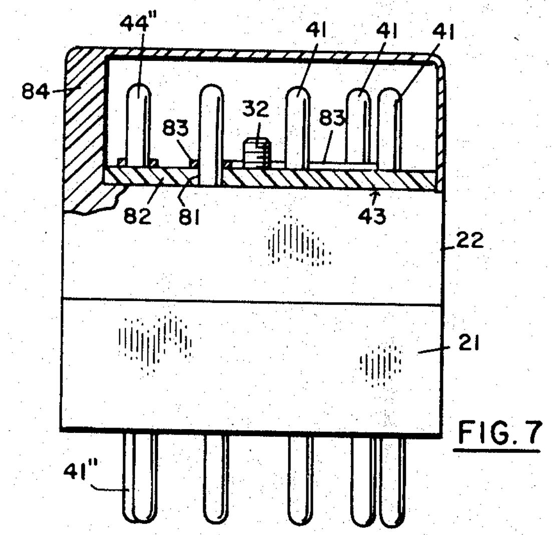
FIGURE 7 represents an elevational view, partly in section, illustrating a package comprising a P–C board and a module, and embodying our invention.
Figure 9:
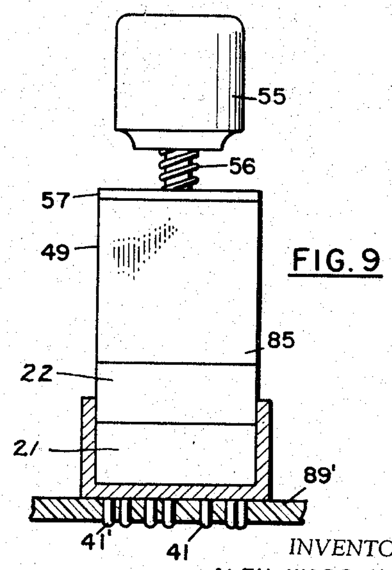
FIGURE 9 represents an end elevational view, partly in section, illustrating a bank of packages comprising a module, and embodying our invention.

Our invention is adapted for use not only in combination with a switch, but with any other desired electrical device or circuitry. For instance, as illustrated in FIGURE 7 the pins 41 projecting from the upper section 22 may pass through suitable orifices 81 in a P–C board 82 mounted on its upper face portion 43 and secured thereto by any suitable means such for instance as the cap screw 32. Electrical communication between desired pins 41 may thus be established by means of the conductor bands 83 on the P–C board in contact with the pins 41. The P–C board circuitry may be connected to the common pin 44'' which extends through the sections 21 and 22 and terminates in the downwardly projecting pin portion 41'' extending beneath the lower section 21. If desired, a suitable cap 84 may be mounted on the upper section 22 in a manner to cover the P–C board 82 and the pins 41, 44''.

While our invention is adapted for use in many different types of circuitry applications, one form of application is that of a key in a keyboard such for instance as a typewriter keyboard or one which is used to operate paper tape punching apparatus. When so used, the unitary package 85 supplies the key, the switch operated by the key, and the components connected by means of the switch. The packages 85 in each row 86, 86', 86'' of the keyboard 87 are preferably mounted in a receptacle 88 having a base strip 89 and upstanding walls 90 defining therebetween recesses 85' of substantially the same internal configuration as the lateral periphery of each package 85. The spacing between the base strip 89 and the walls 90 provide passage for the downwardly projecting pins 41, 41', 41'', so that said pins may extend into a suitable electrical receptacle (not shown) disposed beneath the base strip 89, or into contact with a P–C board 89' disposed beneath the package 85. Each package may be held to the base strip 89 by means of the cap screw 28 downwardly extending through the lower section 21. In this manner, a whole bank 91 of matrix module packages may be carried at the same time. A series of such banks 91, 91', 91'' may be mounted on a rack such for instance as the upwardly inclined rack 92 in a manner to provide a full keyboard.

If desired, complete modules comprising sectional encapsulants 21 and 22 and components 23 contained therein, may be substituted one for another in any of the packages utilizing them. Thus for instance, a previously prepared module may be inserted in the suitable receptacles for same in place of another module, thus quickly and readily to change the programming of the circuit.

We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having thus described our invention, what we claim as new and desire to secure by Letters Patent is:

1. A plug-in code module suitable for control circuit use either as a single control element or in keyboard arrays, the code module being operable for generating a coded electrical signal when actuated and being so constructed that the encoding circuit elements are completely encapsulated and quickly changeable to change the coded output signal as desired, comprising in combination, (a) an upper encapsulating module including a base having an upper face and a lower face and circuit element receiving recesses therein extending from the upper face of the base to the lower face, the cross-sctional area of each recess being slightly larger than the cross-sectional area of the circuit element to be placed therein, each recess being fully open at its lower end to permit insertion of a circuit element into the recess, but being constricted at its upper end to prevent passage of the circuit element therethrough while still permitting passage therethrough of a circuit element conductive lead, and a contact assembly physically connected to and carried by the base at its upper face, said contact assembly having a friction-grip contact terminal disposed above the constricted open end of each said recess to which a circuit connection is desired, whereby, the conductive lead at one end of a circuit element which is placed into one of said recesses is projectable through the constricted open upper end of said recess and into frictionally gripped electrical connection with the contact terminal associated with that particular recess, (b) a lower encapsulating module for retaining circuit elements within the said upper module and for providing circuit connection to an external circuit, said lower module including a base having an upper face and a lower face with apertures extending completely therebetween, said apertures being the same in number as the recesses in said upper module and being located to align with the open lower ends of the latter when the upper and lower modules are operatively assembled, said apertures being of sufficiently small cross-sectional area to prevent passage of a circuit element therethrough while permitting passage therethrough of a circuit element conductive lead, and a plug-in connector physically connected to and carried by the base at its lower face, said plug-in connector having friction-grip contact terminals aligned with each of said base apertures to which an external circuit connection is desired, whereby, a conductive lead at the end of a circuit element placed in a recess of said upper module is projectable through the aligned aperture of said lower module base and into frictionally gripped electrical connection with the associated contact terminal of said plug-in connector, (c) a hollow housing physically engageable with said upper module and extending upward from the upper face thereof in enclosing relationship to said contact assembly, (d) an electrical signal generating device disposed within said hollow housing and having electrical contacts electrically connected to at least some of the contacts of said contact assembly, (e) an actuator carried by and extending into said housing from the outside of the housing and operable to actuate said signal generating device to generate a coded electrical output signal at contact terminals of said plug-in connector, and (f) quick-release securing means holding together said modules and housing, whereby, upon release of said securing means said upper and lower modules and hollow housing are immediately separable from one another for access to said signal generating device and to all of the circuit elements that are contained within said encapsulating modules.

2. A code module as described in claim 1 wherein said signal generating device is an electrical switch.

3. A code module as described in claim 1 wherein said module bases are molded blocks of electrical insulating material.

4. A code module as described in claim 1 wherein the said contact assembly of said upper module and the said plug-in connector of said lower module are detachably fixedly secured to their respective bases.

5. A code module as described in claim 1 wherein said quick-release securing means securingly engages in sequence the said housing, the said upper module, and the said lower module, and releases the same in reverse order, whereby said lower module may be quickly released to provide access to the circuit elements disposed within the recesses of said upper module to change the same as desired and thereafter may be quickly re-secured for immediate use.

6. A code module as described in claim 1 wherein the apertures through said lower module base are inverts of the recesses in said upper module base, whereby portions of the bodies of circuit elements are disposed within recesses of said upper module base and portions of the bodies are disposed within corresponding recess parts of the said apertures of said lower module base.

References Cited

UNITED STATES PATENTS

| | | | |
|---|---|---|---|
| 2,945,918 | 7/1960 | Steinbach | 179—90 |
| 3,005,131 | 10/1961 | Melcher et al. | 317—101 |
| 3,260,819 | 7/1966 | Scuitto et al. | 200—5 X |
| 3,262,021 | 7/1966 | Towne | 317—101 |
| 3,271,708 | 9/1966 | McCormick | 335—205 |

ROBERT S. MACON, *Primary Examiner.*

ROBERT K. SCHAEFER, *Examiner.*

M. GINSBURG, *Assistant Examiner.*